Dec. 3, 1940.    J. A. MOREHEAD    2,223,382
METHOD OF MAKING LENSES
Filed March 9, 1936

INVENTOR.
James A. Morehead
BY Morris Spector
ATTORNEY.

Patented Dec. 3, 1940

2,223,382

UNITED STATES PATENT OFFICE 2,223,382

METHOD OF MAKING LENSES

James A. Morehead, Huntington, W. Va., assignor to Samuel M. Dover, Chicago, Ill.

Application March 9, 1936, Serial No. 67,881

5 Claims. (Cl. 49—82)

This invention relates to lenses and method of making the same, and more particularly to such lenses as are used on automobile tail lights, or the like.

In recent years there has been developed a tail light lens having a very high degree of reflectivity, the structure being such that light from the head lights of an approaching automobile is reflected back in the form of a slightly spreading beam, to indicate to an approaching motorist the presence of an automobile in front, even though the lamp of the tail light of the forward automobile is not functioning. Such lenses are generally of a ruby color and, with a very high degree of reflectivity, they appear to be about as bright from reflected light as from transmitted light, that is, when the bulb of the tail lamp is lighted. It has been recognized that this is an undesirable condition. To overcome this, means has been provided for causing the lens to take on a different appearance under transmitted light than under reflected light. It is to such lenses, and the process of making them, that the present invention more particularly appertains.

It is one of the objects of the present invention to provide a simple and expedient method of making lenses of the above character. This result is accomplished by molding into the lens a piece of glass of light transmitting properties fundamentally different from that of the main body of the lens, and of light reflecting properties also fundamentally different. In the preferred embodiment of the present invention the lens is provided with an insertion of glass of a different color from that of the main body, and of negligible light reflecting properties, although of high light transmitting properties. This piece of glass is molded directly into the body of the lens so as to form one integral piece therewith.

It is a further object of the present invention to provide a lens of the above character wherein the insert is held in place in a simple and reliable manner so that the same cannot possibly be displaced from the rest of the lens.

In accordance with the present invention the insert is so made that the surface thereof which is to be the exposed or front surface in the lens is of the shape that it is to have in the finally completed lens, and the insert is of a thickness almost but not quite the requisite thickness of the completed lens of which it is to be a part at the place where it is to be located in the completed lens. The preformed part or insert is then placed into a mold, and the rest of the lens is then molded to the desired shape around the preformed part in such a way that the rest of the lens becomes integrally united with the preformed insert. In the molding operation a layer of transparent lens material is formed over one surface of the insert and integrally united with said surface. If the insert is to have light reflecting properties rather than light transmitting properties, a mirror reflecting surface is then formed on the layer of lens material that was molded over the insert.

The attainment of the above and further objects of the present invention will be apparent from the following specification taken in conjunction with the accompanying drawing forming a part thereof.

Figure 1:
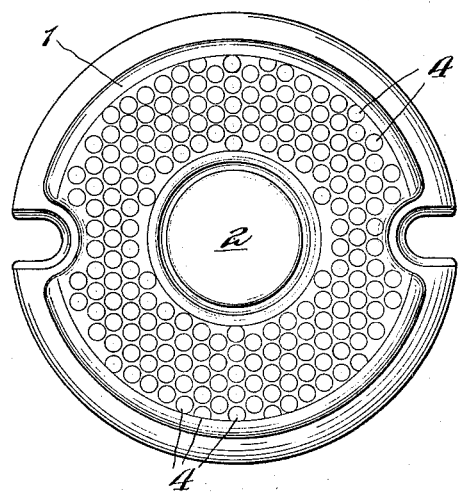
Figure 1 is a front view of a lens constructed in accordance with the teachings of my invention.
Figure 2:
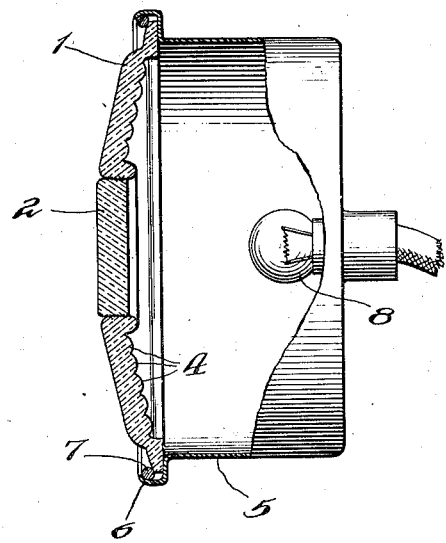
Figure 2 is a longitudinal sectional view through the lens, and showing the same applied to the tail lamp of an automobile.
Figure 3:
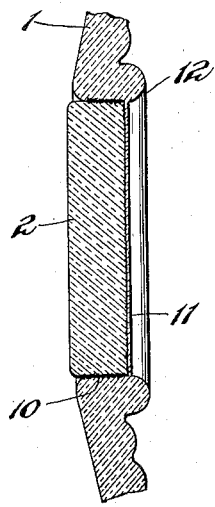
Figure 3 is an enlarged sectional view of a portion of the lens of Figures 1 and 2.

Reference may now be had more particularly to Figures 1, 2 and 3. The lens of Figure 1 comprises a body 1 of glass, preferably, although not necessarily, ruby colored, and an insert 2, also of glass, and of different light transmitting and light reflecting properties from that of 1. The insert 2 is preferably, although not necessarily, blue, that is, contains cobalt blue, and is of a high light transmitting properties. This insert is not particularly adapted as a reflector. A number of protuberances 4 may be formed on the back surface of the body 1 in order to increase the light reflecting properties of the body 1 of the lens. These protuberances may be of any shape known in the art, for accomplishing this purpose. For instance, they may be projections in the forms of substantially right angled cones, as shown in the patent to Sharp, No. 1,675,431, or they may be in the form of tetrahedrons, as shown in the patent to Stimson, No. 1,874,138, or they may be in the form of reflecting buttons. The purpose of these projections is to reflect light, from the head lights of an approaching automobile, in the form of a slightly spreading beam along substantially the path of the incident beam, so that the tail lamp lens will be rendered clearly visible to the approaching motorist by light reflected from the head lights of the approaching automobile. The insert 2 has no such light reflecting properties. Therefore, under reflected light, the lens will appear as a ruby colored ring, or disc, having a center dark spot.

In Figure 2 I have illustrated a tail lamp of standard construction, except for the improved lens. It is understood that my present lens is applicable to other forms of lamps. The tail lamp shown by way of illustration comprises a metal body 5 having an overhanging rim 6 in which is inserted a spring ring 7 that holds the lens in place, in a manner well known in the art, although any other means may be used for holding the lens in place. An electric light bulb 8 is provided, as is usual. Light from the bulb passes through the body of the glass 1, in the usual manner, to produce a bright ruby colored illumination. The light also passes through the center insert 2 and produces a very bright beam of white light. This light is entirely absent when the lens is illuminated by reflection, and therefore serves as a distinguishing characteristic to indicate when the bulb 8 is lighted.

Reference may now be had to Figure 3 which shows the manner whereby the insert 2 is held in place in the body 1.

The glass of the insert merges and is fused with the glass of the body 1 at the periphery 10 thus firmly uniting the two. In addition, there is a layer of glass 11 on the back of the insert 2, said layer being part of and integral with the main body 1, and being also fused into the back of the insert 2. In the case of a light transmitting insert this layer 11 is so thin that it is practically invisible and does not modify the light transmitting characteristics of the insert 2, but it does help hold the insert 2 in place. The greater the thickness of this layer the greater will be the effect thereof on the characteristics of the light passing through the insert.

Figure 4:
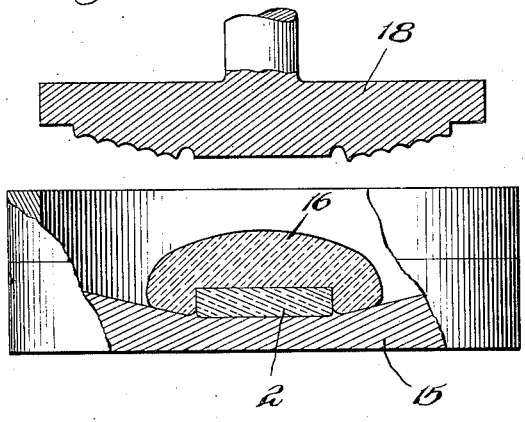
Figure 4 is a diagrammatic, fragmentary sectional view of a pair of molds within which the lens is made.

In Figure 4 I have shown, diagrammatically, a method of making the lens of Figures 1, 2 and 3. The insert 2 is first made in any desired manner, as by molding, and then, while it is still hot, it is placed in a mold 15, in which the lens proper is to be formed. A mass of glass 16 is then dropped into the mold 15, and the plunger 18 is then pressed into the mold 15 to press the mass of glass 16 to the desired shape. The glass 2 is preferably of a kind having a coefficient of expansion and contraction substantially the same as that of the glass 16, which is to constitute the body portion 1. They are both preferably, but not necessarily, silica glass. The body of glass 16 may be of a temperature of approximately 1800° F. when it is dropped into the mold 15. At that time the temperature of the insert 2 is about 1000°, although these temperatures may be varied over a very wide range. With glass of this kind it is essential that the temperature of the insert 2 shall be quite high at the time the molten glass 16 first comes in contact with it, for otherwise the chill might produce undesirable stresses in the glass resulting, perhaps, in cracking of the same. The die 18 presses the mass of glass 16 to the desired shape, namely, the shape shown in Figures 1, 2 and 3. After the glass has set sufficiently, the plunger 18 is retracted from the mold, and thereafter the lens is withdrawn. During the process of making the lens, the heat of the body of glass 16 in contact with the insert 2 causes a fusion of the glass 16 with the insert 2, to form an integral mass of glass. The bead 12 formed in the body 1, around the insert 2, by the mold 18, serves to strengthen the body 1 along the insert 2 so that as the glass of the body 1 contracts, and shrinks around the insert, it will tightly grip the same, without any danger of cracking, or undue stressing of the material.

From the above description it is apparent that I have provided a simple lens that has a distinctly different appearance when viewed by reflected light than when viewed by transmitted light. In the lens here illustrated the difference is primarily one of color. By transmitted light the center portion appears as a white beam surrounded by a red field at the portion 1. By reflected light the body 1 appears red and the center portion appears black, due to lack of reflection. If desired, the insert 2 may be made to have high light reflecting properties and no light transmitting properties. This can be accomplished by forming a mirror reflecting layer on the back of the insert 2, whereby external light is reflected, but no light from the bulb 8 is transmitted through the insert. As another alternative, the lens may be constructed so that the sole difference is one of color. The insert 2 may have the same (or different) type of protuberances thereon as the lens portion 1, in which event the portion of glass 11 is omitted. By making the lens portion 2 of glass of different color from the portion 1, the desired results may be obtained. The portion 2 may be made of glass that appears one color by transmitted light and a different color by reflected light.

The lens part 2 may be joined with the part 1 by means other than fusion. For instance, it may be cemented in place.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. The method of making a lamp lens which comprises forming a part of the lens of glass and of a shape to have one function in the lamp lens, placing that pre-formed part in a mold and placing a mass of molten glass upon it whereby the temperature of the contacting surfaces of the molten glass and the pre-formed glass part commence to equalize, then molding the molten glass to a shape having another function in the lens and forming the molten mass and the pre-formed part into one integral structure, with the pre-formed part extending substantially entirely through the subsequently molded glass, and in the molding operation fusing a thin layer of glass from said molten mass over one surface of the preformed part and forming a reenforcing annular bead of glass around the thin layer and around the pre-formed part adjacent the juncture between the pre-formed lens part and the rest of the lens.

2. The method of making a light transmitting and reflecting signalling lamp lens of the type wherein a part of the lens is constructed to adapt it particularly for transmitting light therethrough and another part is constructed to adapt it particularly to reflect incident light substantially parallel to the incident beam, which comprises forming one of said parts of glass into the desired shape that it is to have in the ultimate lens, inserting said pre-formed part into a mold, and molding glass to the desired shape of the other part around said pre-formed part so that the glass of the second formed part becomes integrally united with the pre-formed part, and with the pre-formed part extending substantially entirely through the subsequently molded part, and with the molded glass surround the pre-formed part and including a thin layer of glass overlying the pre-formed part and fused thereto.

3. The method of making a signal lamp lens which comprises, forming a part of the lens with the front and rear thereof of the final shapes required in the ultimate lens, inserting said preformed part into a mold, molding glass to the desired shape of the other part around said preformed part so that the glass of the second formed part becomes integrally united with the pre-formed part and in said molding operation forming a thin layer of molded glass overlying the pre-formed part and fused thereto, and forming a mirror reflecting surface on the back of the lens to reflect external light striking the first mentioned part.

4. The method of forming a lamp lens which comprises forming a preformed lens insert of a thickness almost but not quite the requisite thickness of the completed lens of which it is to be a part at the place where it is to be located in the complete lens, inserting said preformed part into a mold and molding the rest of the lens to the desired shape around said preformed part so that the last mentioned molded part becomes integrally united with the preformed part, and in said molding operation die forming a thin layer of transparent material over one surface of said insert and integrally uniting said layer with said one surface.

5. The method of forming a lamp lens which comprises forming a preformed lens insert of a thickness almost but not quite the requisite thickness of the completed lens of which it is to be a part at the place where it is to be located in the completed lens, inserting said preformed part into a mold and molding the rest of the lens to the desired shape around said preformed part so that the last mentioned molded part becomes integrally united with the preformed part, and in said molding operation die forming a thin layer of transparent material over one surface of said insert and integrally uniting said layer with said one surface, and then forming a reflecting surface on said die formed thin layer.

JAS. A. MOREHEAD.